United States Patent
Mancini

(10) Patent No.: US 8,939,140 B2
(45) Date of Patent: Jan. 27, 2015

(54) BOW STABILIZER WITH CAMERA ATTACHMENT FEATURE

(75) Inventor: Ralph J. Mancini, Danbury, CT (US)

(73) Assignee: Archery Technical Innovations LLC, Danbury, CT (US)

( * ) Notice: Subject to any disclaimer, the term of this patent is extended or adjusted under 35 U.S.C. 154(b) by 132 days.

(21) Appl. No.: 13/507,379

(22) Filed: Jun. 22, 2012

(65) Prior Publication Data
US 2013/0340738 A1 Dec. 26, 2013

(51) Int. Cl.
*F41B 5/20* (2006.01)
*F41B 5/14* (2006.01)

(52) U.S. Cl.
USPC ................................ 124/89; 124/86

(58) Field of Classification Search
USPC .......................... 124/86, 87, 88, 89
See application file for complete search history.

(56) References Cited

U.S. PATENT DOCUMENTS

| | | | | |
|---|---|---|---|---|
| 3,058,505 A | * | 10/1962 | Emmett | 206/315.11 |
| 3,834,052 A | * | 9/1974 | Steck, III | 42/90 |
| 4,890,128 A | * | 12/1989 | Kania | 396/426 |
| 5,341,791 A | * | 8/1994 | Shafer | 124/87 |
| 5,379,746 A | * | 1/1995 | Sappington | 124/87 |
| 6,925,721 B2 | * | 8/2005 | Dietz | 33/265 |
| 6,997,174 B2 | * | 2/2006 | Sandberg | 124/89 |
| 7,604,420 B2 | | 10/2009 | Moody et al. | |
| 7,647,922 B2 | * | 1/2010 | Holmberg | 124/86 |
| 7,780,363 B1 | * | 8/2010 | Holmberg | 396/426 |
| 2007/0157503 A1 | * | 7/2007 | Holmberg | 42/124 |
| 2010/0236536 A1 | * | 9/2010 | Erickson | 124/88 |
| 2012/0073556 A1 | | 3/2012 | Knowles | |

OTHER PUBLICATIONS

S4 Gear JackKnife Smartphone Bow Mount (page taken from Cabelas website).
Deer Ridge Gun and Bow Mount, (page taken from Cabelas website).

* cited by examiner

*Primary Examiner* — John Ricci
(74) *Attorney, Agent, or Firm* — Ralph J. Mancini

(57) ABSTRACT

A kit for mounting a camera to a bow is provided. The kit includes a bow stabilizer for attachment to the bow; and a mounting bracket for attachment to the stabilizer, the bracket including a seat for the camera, an arm extending from the seat at a first end, and a connector at a second end for attaching the arm to the stabilizer.

12 Claims, 5 Drawing Sheets

BOW STABILIZER WITH CAMERA ATTACHMENT FEATURE

BACKGROUND OF THE INVENTION

1. Field of the Invention

The present invention relates generally to a stabilizer for a sports bow, and more specifically to a stabilizer for a sports bow incorporating an integrated attachment feature for a camera.

2. Description of the Related Art

The use of cameras during hunting activities is extremely popular with hunters and is ever increasing in popularity. The cameras allow hunters to capture images of their harvests in real time, providing a record and chronology of their experiences. However, operation of a camera during hunting is often cumbersome, especially with archery equipment such as an archery bow, which requires both hands to operate. Attempting to operate a camera while holding and operating an archery bow is quite difficult and often results in missed camera shots and/or missed harvest opportunities.

In response to the difficulty of simultaneously filming the hunt while operating the archery bow, several devices in the prior art have been developed which allow a user to mount a camera to an archery bow. Conventional devices for attaching a camera to a bow often require attaching a camera mount to a limb of a bow that extends outwards to a side of the bow. Further, when detaching and re-attaching current mounting devices, such as mounting devices secured to limbs of a bow via straps, it is often necessary to manually re-site the camera in order for the camera to track intended targets.

SUMMARY OF THE INVENTION

The present invention has been made to address at least the above problems and/or disadvantages and to provide at least the advantages described below.

An aspect of the present invention is to provide an efficient means for attaching a camera to an archery bow that lets the user take video footage of an arrow leaving the bow and hitting a target. Another aspect of the present invention is to provide a novel bow stabilizer that comprises integrated camera attachment means that can universally accommodate a variety of hand held cameras.

According to an aspect of the present invention, a kit for mounting a camera to a bow is provided. The kit includes a bow stabilizer for attachment to the bow; and a mounting bracket for attachment to the stabilizer, the bracket including a seat for the camera, an arm extending from the seat at a first end, and a connector at a second end for attaching the arm to the stabilizer.

According to another aspect of the present invention, a stabilizer for an archery bow is provided. The stabilizer includes an elongated body having a first end which connects to the archery bow, and a second end disposed a distance from the bow, the body having a pair of mounting collars for accommodating a footing for a camera mount, at least one of the collars being movable along the elongated body towards the other collar to hold the footing of the camera mount between the pair of collars to secure the footing to the elongated body.

According to another aspect of the present invention, a stabilizer for an archery bow is provided. The stabilizer includes an elongated body having a first end which connects to the archery bow, and a second end disposed a distance from the bow, the elongated body having a pair of straps each fixed and secured at one end to the elongated body and being spaced from each other for accommodating a footing for a camera mount, each of the straps capable of being wrapped over the footing of the camera mount to secure the footing to the elongated body.

According to another aspect of the present invention, a bracket for mounting a camera to an archery bow is provided. The bracket includes an arm portion having a first end and a second end, the first end having a seat for mounting a camera, and the second end having a T-shaped footing for attaching to the bow.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
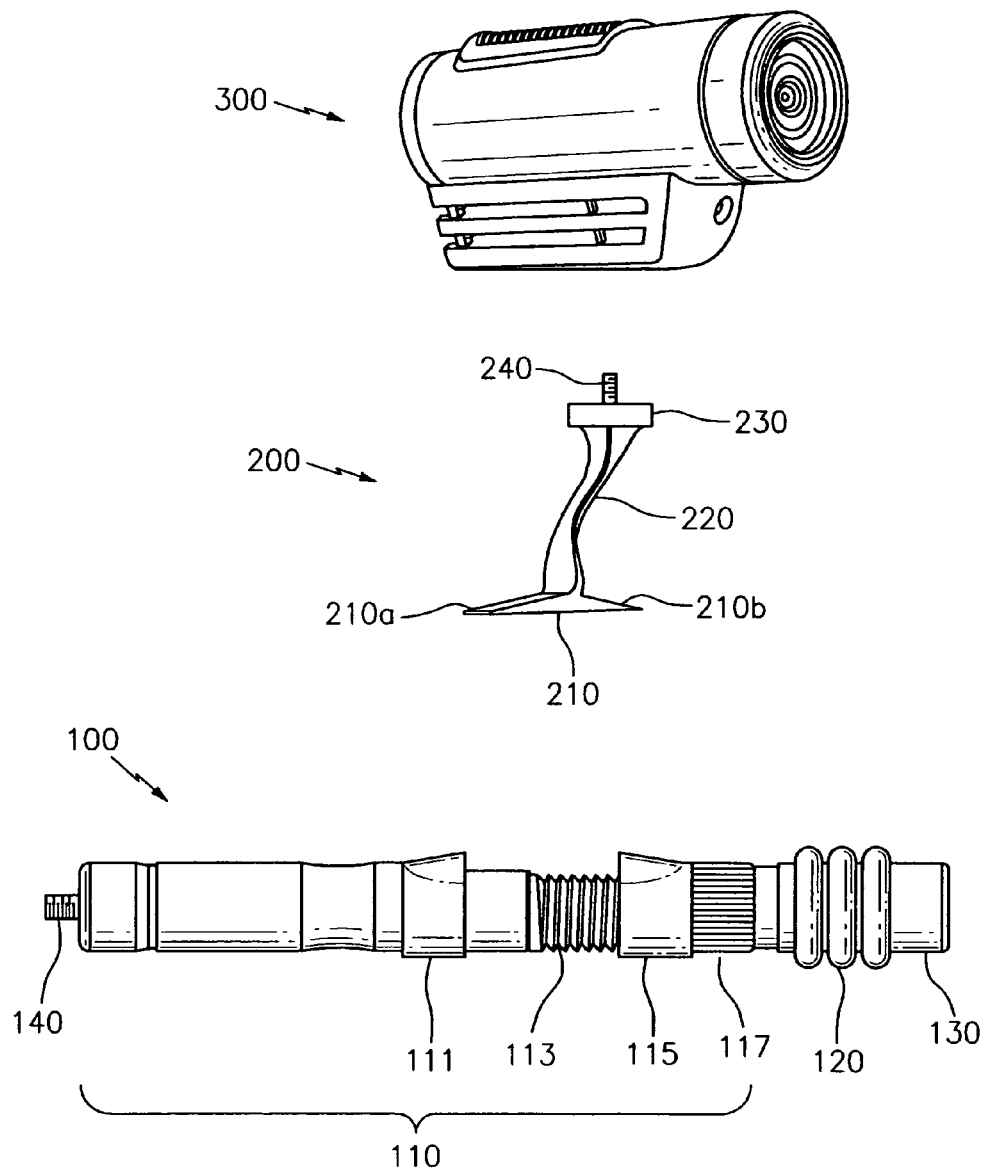
FIG. 1 is an exploded view illustrating a camera, a bow stabilizer, and a mounting bracket, according to an embodiment of the present invention.

Embodiments of the present invention are described in detail below in detail with reference to the accompanying drawings. The present invention may be embodied in different forms and should not be construed as limited to the embodiments set forth herein; rather, these embodiments are provided so that this disclosure will convey the scope of the present invention to those skilled in the art. The same or similar components may be designated by the same or similar reference numerals although they are illustrated in different drawings. Detailed descriptions of constructions or processes known in art may be omitted to avoid obscuring the subject matter of the present invention.

Figure 2:
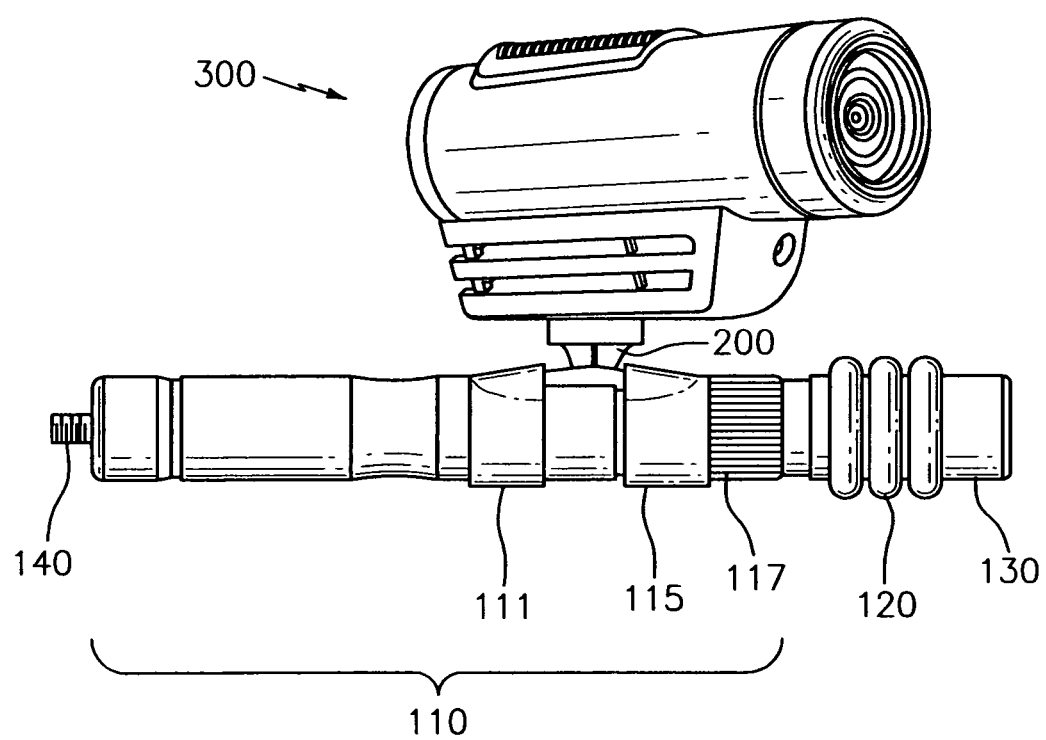
FIG. 2 is a diagram illustrating the camera, the bow stabilizer, and the camera mounting bracket of FIG. 1 in an assembled state according to an embodiment of the present invention.

FIG. 1 is an exploded view illustrating a camera, a bow stabilizer, and a mounting bracket, according to an embodiment of the present invention. FIG. 2 is a diagram illustrating the camera, the bow stabilizer, and the mounting bracket of FIG. 1 in an assembled state according to an embodiment of the present invention.

Referring to FIGS. 1 and 2, a bow stabilizer 100 according to an embodiment of the present invention includes a weight 130, a dampener 120, and a main body 110. One end of the main body 110 attaches to a bow (not shown) via a screw mount 140. Although a screw mount 140 is used in the present example, other devices for securing the bow stabilizer 100 to a bow may be used in accordance with embodiments of the present invention. A portion or all of the length of the main body 110 may be hollow, in order to reduce the overall weight of the stabilizer 100.

The dampener 120 and weight 130 are attached along an opposite end of the main body 110. In the embodiment shown, the dampener 120 extends directly from the main body 110, while the weight 130 extends from an opposite end of the dampener 120. The main body, the dampener 120, and the weight 130 may be permanently attached to each other, or they may be constructed as modular removable components that may be attached and removed via screw mounts (not shown), or other such devices. Additional weights 130 may be provided for attachment adjacent the screw mount 140 to act as counterweights to help balance the bow stabilizer 100 when the camera 300 is mounted to the stabilizer 100.

The main body 110 of the stabilizer 100 includes a fixed mounting collar 111, a movable mounting collar 115 and a locking ring 117 for removably attaching a mounting bracket 200 to the stabilizer 100. The fixed mounting collar 111 stays fixed relative to the main body 110 of the stabilizer 100, while the movable mounting collar 115 is an annular ring that is movable in a longitudinal direction of the stabilizer 100.

The camera mounting bracket 200 (or "camera mount") includes a seat 230 for connecting to a camera 300. In the embodiment shown, the seat 230 includes a screw mount 240 for connecting to a variety of cameras and other devices having a corresponding screw mount holes (not shown). The screw mount 240 for connecting to a camera 300 is merely shown as an example, and other similar devices for connecting the camera seat 230 to the camera 300 (or other such device) may be used in accordance with embodiments of the present invention.

The seat 230 is connected to a base 210 of the camera mounting bracket 200 via a connecting arm 220. The connecting arm 220 is fixedly connected to each of the seat 230 and the base 210. Alternatively, the connecting arm 220 may be movably connected to either or both of the seat 230 and the base 210 in order to allow for adjustment of the position of the camera 300 relative to the base 210. The base 210 includes a first end 210a and a second end 210b protruding in opposite directions arranged to form a T-shaped footing with respect to the connecting arm 220. The camera mount 200 attaches to the stabilizer 100 via the first end 210a and second end 210b of the base 210, and the camera 300 attaches to the mounting bracket 200 at the seat 230 via the screw mount 240.

FIG. 2 shows the fully assembled camera, stabilizer and mounting bracket. A method for attaching a camera mount 200 to a stabilizer 100 according to an embodiment of the present invention is described as follows with reference to FIGS. 3 and 4.

Figure 3:
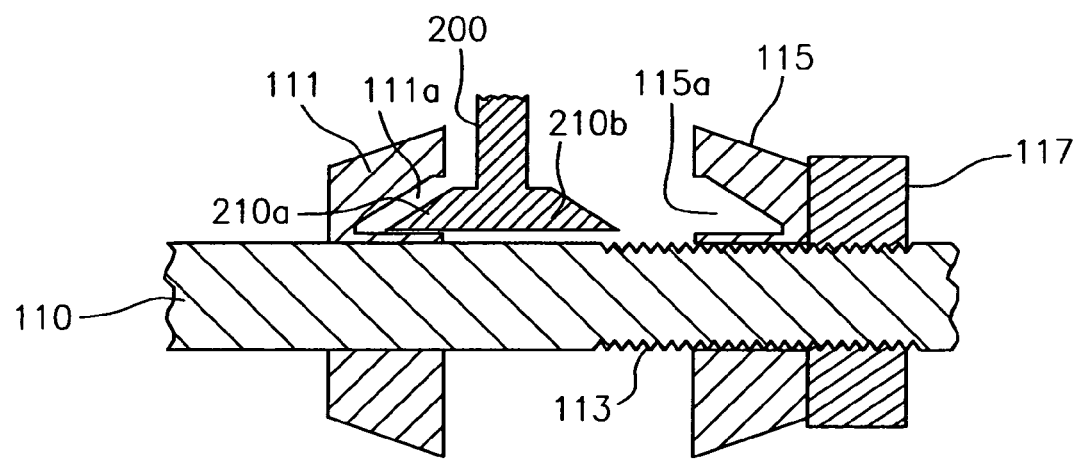
FIG. 3 is a diagram illustrating a cross-sectional view of a portion of a main body of the bow stabilizer and camera mounting bracket of FIG. 1 in a disassembled state.
Figure 4:
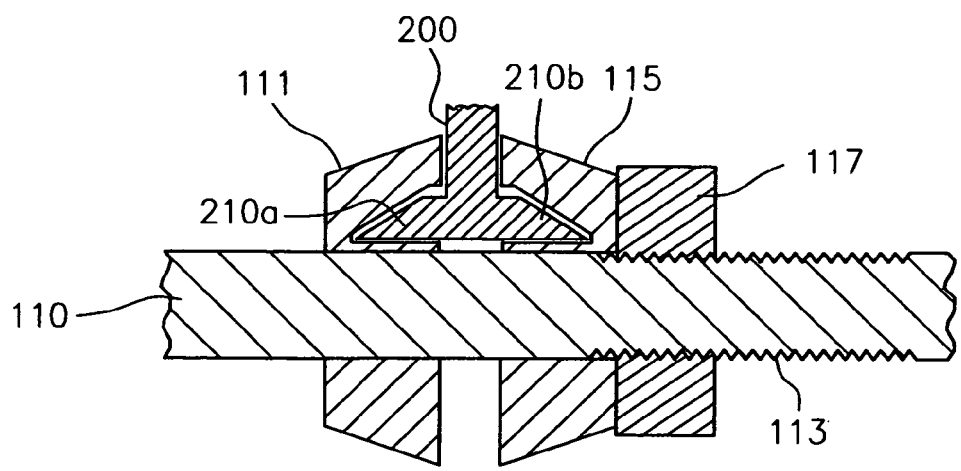
FIG. 4 is a diagram illustrating a cross-sectional view of the portion of the main body of the bow stabilizer and the camera mounting bracket of FIG. 3 in an assembled state according to an embodiment of the present invention.

FIG. 3 is a diagram illustrating a cross-sectional view of a portion of a main body of the bow stabilizer and mounting bracket of FIG. 1 in a disassembled state. FIG. 4 is a diagram illustrating a cross-sectional view of the portion of the main body of the bow stabilizer and the mounting bracket of FIG. 3 in an assembled state according to an embodiment of the present invention.

Referring to FIGS. 3 and 4, the fixed mounting collar 111 and the movable mounting collar 115 each include respective slots 111a and 115a for receiving one of the first end 210a and second end 210b of the base 210 of the camera mount 200. In order to attach the camera mount 200 to the stabilizer 100, the movable mounting collar 115 is moved away from the fixed mounting collar 111. Then, the first end 210a of the base 210 of the camera mount 200 is inserted into slot 111a in the fixed mounting collar 111, as shown in FIG. 3.

After the first end 210a of the base 210 of the camera mount 200 is inserted into the slot 111a in the fixed mounting collar 111, the movable mounting collar 115 is moved towards the camera mount 200 such that the second end 210b of the base 210 of the camera mount 200 is received into the slot 115a in the movable mounting collar 115, as shown in FIG. 4. In the state shown in FIG. 4, the camera mount 200 is secured to the stabilizer 100.

Although in the above-described example, the first end 210a of the base 210 is inserted into the slot 111a of the fixed mounting collar 111, either end of the base 210 may be inserted into either one of the slots in the fixed mounting collar 111 and the movable mounting collar 115 according to embodiments of the invention. Further, although the in above-described example, the first end 210a of the base 210 is inserted into the slot 111a of the fixed mounting collar 111 before the second end 210b of the base is inserted into the slot 115a of the movable mounting collar 115, it is not necessary to perform the insertions in this order. For example, either end of the base 210 of the camera mount 200 may be inserted into the slot 115a of the movable mounting collar 115 first, such that both the movable mounting collar 115 and the base 210 move towards the fixed mounting collar 111 together in order to secure the mounting bracket 200 to the stabilizer 100, in accordance with embodiments of the present invention.

The first end 210a and second end 210b of the base 210 of the camera mount 200 which form the T-shaped footing may have either of a flat bottom surface or a curved bottom surface which corresponds to the curved surface of the stabilizer main body 110. The slots 111a and 115a of the fixed mounting collar 111 and the movable mounting collar 115 have shapes corresponding to the shapes of the first end 210a and 210b, such that the slots 111a and 115a may securely receive the first end 210a and second end 210b of the base 210 of the camera mount 200.

Camera 300 can be attached to the seat 230 either prior to camera mount 200 being secured to stabilizer 110, or after stabilizer 100 is secured to camera mount 200, depending on a user's preference.

When the movable mounting collar 115 is moved towards the fixed mounting collar 111 to secure the base 210 of the camera mount 200, the movable mounting collar 115 may be locked into position by a variety of mechanisms. For example, as illustrated in FIGS. 3 and 4, according to an embodiment of the present invention, the stabilizer 100 also includes a threaded locking ring 117 adjacent to the movable mounting collar 115, while the main body 110 of the stabilizer 100 includes corresponding threads 113. By rotating the locking ring 117, the locking ring 117 moves towards or away from the fixed mounting collar 111 in a longitudinal direction of the main body 110 of the stabilizer 100 in order to lock the camera mount 200 in place under the movable mounting collar 115 and the fixed mounting collar 111.

According to an alternative embodiment of the present invention (not shown), the movable mounting collar 115 itself may include threads corresponding to the threads 113 in the main body 110 of the stabilizer 100. In such an embodiment, the movable mounting collar 115 rotates in order to move in the longitudinal direction of the main body 110 of the stabilizer 100. In this case, slot 115a is modified to be circumferential in dimension and shape, to rotate over second and end 210b as the movable mounting collar 115 is moved towards the fixed mounting collar 111.

Figure 5:
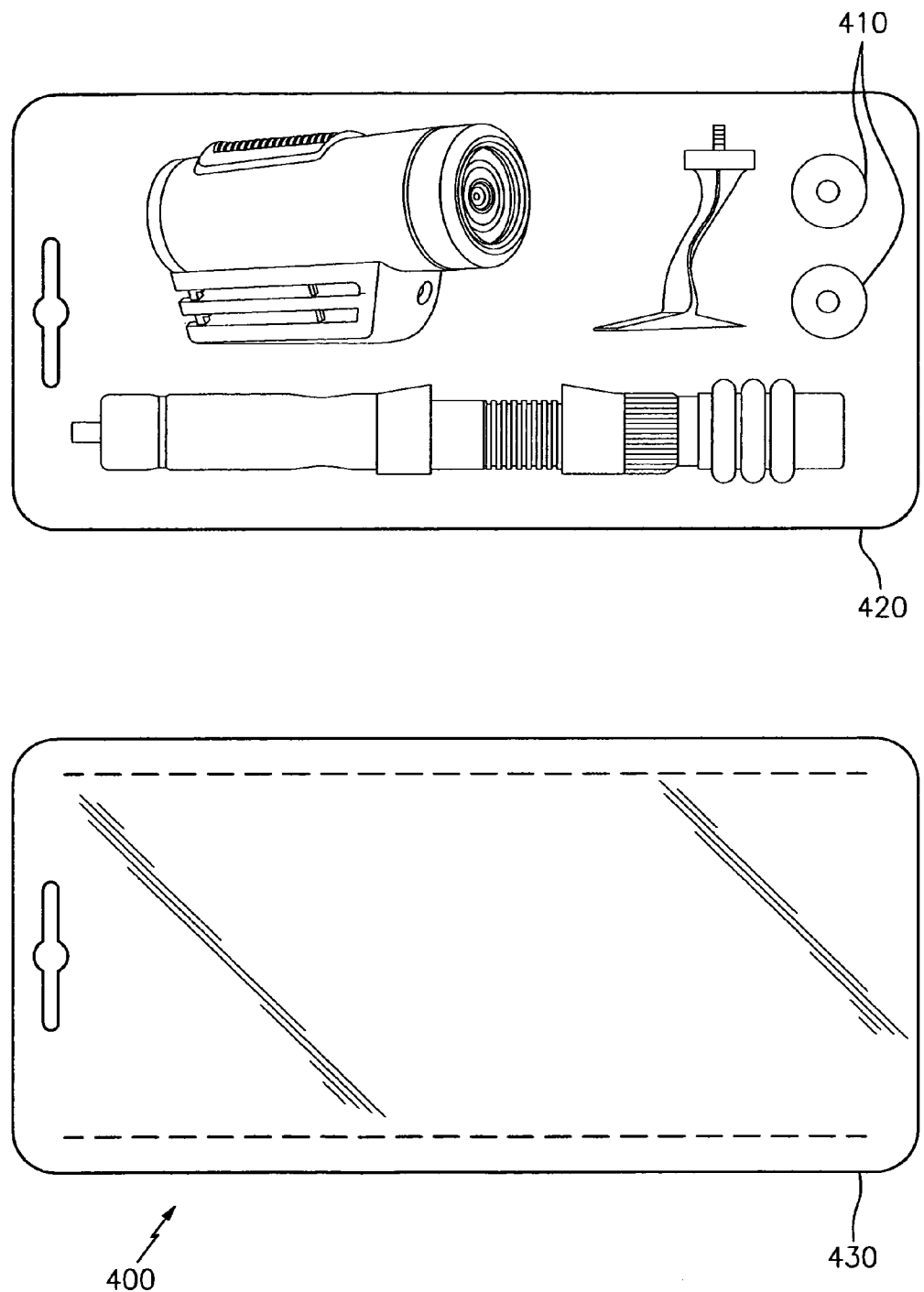
FIG. 5 is a view of a package for containing the bow stabilizer, camera mounting bracket and camera according to the present invention.

It is also contemplated that the stabilizer 100 and camera mount 200 are packaged together as a kit 400, as illustrated in FIG. 5. The kit 400 of FIG. 5 may also include camera 300, and may further include counterweights 410 to help balance the stabilizer 100, camera mount 200, and camera 300 when fully assembled and secured to a bow. The kit includes a back packaging card or insert 420, and a front packaging cover 430, preferably made of clear plastic to allow viewing of the contents of the kit.

Figure 6:
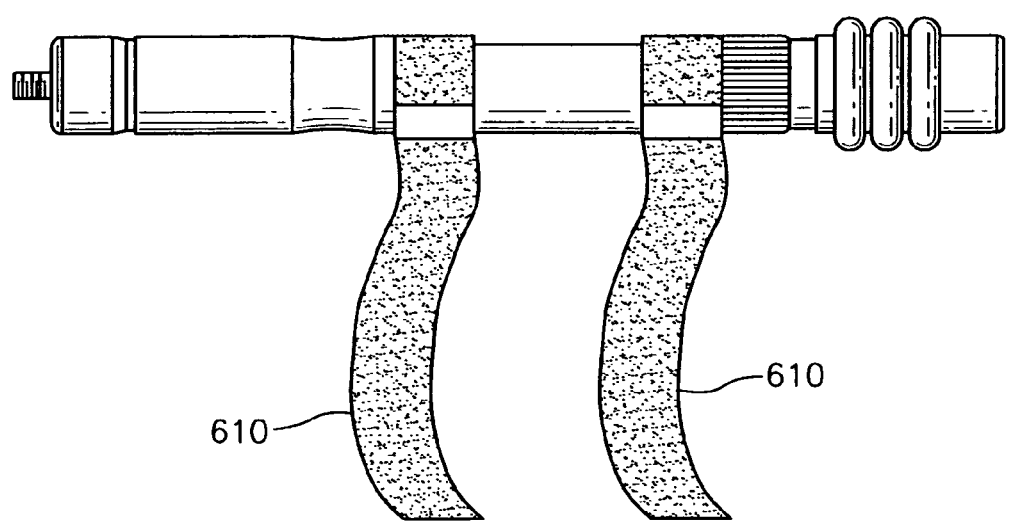
FIG. 6 is a view of an alternate embodiment of the bow stabilizer according to the present invention.

In another embodiment, the mounting collars may be replaced by straps 610, as shown in FIG. 6, that are fixed at one end and can be wrapped over themselves to secure camera mount 200 to stabilizer 100, such as by snaps or Velcro®.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A kit for mounting a camera to a bow, comprising: a bow stabilizer for attachment to the bow; a mounting bracket for attachment to the stabilizer, the bracket including a seat for the camera, an arm extending from the seat at a first end, and a connector at a second end for attaching the arm to the stabilizer, wherein the arm and connector comprise a T-shaped footing for placement on the stabilizer, the footing being attached to the stabilizer at a first end and a second end such that the arm extends away from the stabilizer, and wherein the stabilizer includes a fixed mounting collar including a slot and a movable mounting collar, the fixed mounting collar being shaped to accommodate the first end of the footing, the movable mounting collar being shaped to accommodate the second end of the footing and being movable in a longitudinal direction of the stabilizer towards the fixed mounting collar to secure the footing to the stabilizer.

2. The kit as claimed in claim 1, wherein the movable mounting collar is movable over the stabilizer in the longitudinal direction, and includes a receiving slot for accommodating the second end of the footing, and the first end of the footing is secured in the fixed mounting collar by friction.

3. The kit as claimed in claim 2, further comprising a locking ring adjacent to and abutting the movable mounting collar for tightening the movable mounting collar over the second end of the footing to secure the footing to the stabilizer.

4. The kit as claimed in claim 1, further comprising at least one counterweight for attachment to the stabilizer.

5. The kit as claimed in claim 1, further comprising a package for containing each item of the kit.

6. A stabilizer for an archery bow, comprising: an elongated body having a first end which connects to the archery bow, and a second end disposed a distance from the bow, the body having a pair of mounting collars for accommodating a footing for a camera mounting bracket, at least one of the collars being movable along the elongated body towards the other collar to hold the footing of the camera mounting bracket between the pair of collars to secure the footing to the elongated body.

7. The stabilizer as claimed in claim 6, wherein the elongated body has at least one threaded portion adjacent to the at least one movable collar which engages a threaded annular ring, such that the at least one movable collar is moved by rotating the annular ring over the threaded portion of the elongated body.

8. The stabilizer as claimed in claim 7, wherein the footing has a T-shape, each end of the "T" being accommodated by one of the mounting collars.

9. The stabilizer as claimed in claim 8, wherein the elongated body has a flattened land area upon which the footing rests.

10. The stabilizer as claimed in claim 6, wherein the camera mounting bracket has an arm that extends away from the footing and terminates in a seat for mounting a camera.

11. A bracket for mounting a camera to an archery bow, comprising: an arm portion having a first end and a second end, the first end having a seat for mounting a camera, and the second end having a T-shaped footing for attaching to the bow, wherein the footing has a flattened underside opposite the arm portion for placement against the bow for attaching the bracket to the bow.

12. The bracket as claimed in claim 11, wherein the footing has a flattened underside opposite the arm portion for placement against a stabilizer of the bow for attaching the bracket to the stabilizer.

* * * * *